UNITED STATES PATENT OFFICE.

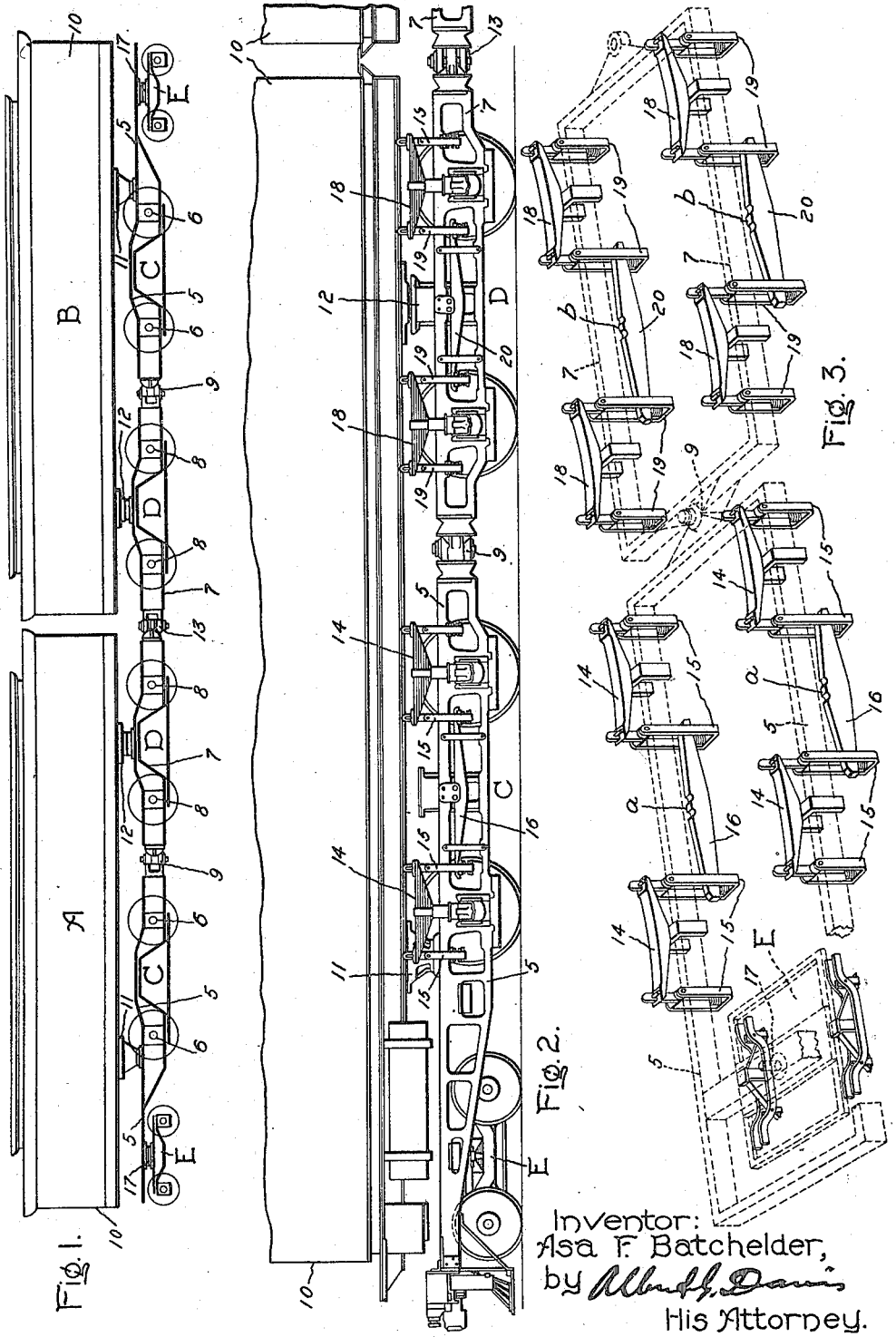

ASA F. BATCHELDER, OF SCHENECTADY, NEW YORK, ASSIGNOR TO GENERAL ELECTRIC COMPANY, A CORPORATION OF NEW YORK.

LOCOMOTIVE.

1,180,755.   Specification of Letters Patent.   Patented Apr. 25, 1916.

Application filed January 28, 1916. Serial No. 74,895.

*To all whom it may concern:*

Be it known that I, ASA F. BATCHELDER, a citizen of the United States, residing at Schenectady, county of Schenectady, State of New York, have invented certain new and useful Improvements in Locomotives, of which the following is a specification.

My invention relates to locomotives and is particularly applicable to electric locomotives.

It has for its object a novel arrangement and construction of the running gear of such a locomotive, which is divided into a plurality of sections so that the locomotive may be operated around curves of small radius without injurious wear on the flanges of the locomotive wheels and without destructive effects on the railway tracks, and which has a system of equalization which equalizes the weight on the different wheels of the locomotive and maintains the same relation of weight regardless of track conditions, within reasonable limits.

The various features of the novelty which characterize my invention are pointed out with particularity in the claims annexed to and forming a part of this specification.

For a better understanding of my invention, reference may be had to the following description taken in connection with the accompanying drawing, in which—

Figure 1 is a skeleton view of a locomotive embodying my invention; Fig. 2 is a side elevation of one-half of the locomotive shown in Fig. 1, and Fig. 3 is a perspective view of the equalizing system of one-half of my locomotive.

Referring to Fig. 1 of the drawing, it will be seen that my complete locomotive is divided into two independent halves A and B. Each half of the locomotive is complete in itself and may be operated independently of the other half. Each half is provided with an unsymmetrical truck C and a symmetrical truck D. Each of the unsymmetrical trucks has a main truck frame 5 and driving axles 6 mounted for a limited vertical movement therein. The axles 6 are driven by suitable electric motors (not shown) carried by the truck. The journal boxes for these axles and the manner in which they are mounted in the truck frame may be of any well known style, and form no part of my invention. The truck frame 5 is supported by means of a spring system of suspension on the driving axles 6 jointly at two points, one on each side of the truck. The truck frame 5 also has a pivotal bearing on a guiding truck E. The frames of the unsymmetrical trucks are thus supported at three points, one of the points of support being on the center-pin 17 of the guiding truck and one each of the other two points of support is located on each side of the truck, half way between the driving axles 6. These trucks are therefore in stable equilibrium. Each of the symmetrical trucks has a truck frame 7 and a plurality of driving axles 8 on which the truck frame is supported by a spring system of suspension jointly at two points, one on each side of the truck. The journal boxes for the axles 8 are similar to the journal boxes for the axles 6 and the manner in which they are mounted in the truck frame 7 is similar to the mounting of the journal boxes 6. The axles 8 are also driven by electric motors (not shown) carried by the truck. The symmetrical trucks D are coupled to the unsymmetrical trucks C by means of leading connections 9 and, in order to give these trucks stability, the leading connection 9 is preferably a hinged joint so arranged as to steady the symmetrical truck and keep it in its proper horizontal position, whereby any movement of an unsymmetrical truck will effect a similar movement in the symmetrical truck following. Each half of the locomotive is provided with a cab 10 which has pivotal connections 11 and 12 located respectively on the unsymmetrical truck and the symmetrical truck. The weight of each half of the locomotive is thus distributed to its trucks and is equalized on the different wheels by the equalizing system above described. This equalizing system also maintains the same distribution of weight under substantially all track conditions. It is necessary that one of the connections 11 or 12 be so constructed that it will permit of some longitudinal sliding motion as well as pivotal motion. This may be accomplished in any one of several well known ways as, for instance, by providing a long slot in the lower portion of one of the connections, in which a projection from the upper portion of the connection moves. One of these connections 11 or 12 is arranged to give a wide support to prevent the cab from tipping sidewise, and the other connection is preferably arranged to give a narrow support to allow tipping at this point. This arrangement of the pivotal connections for the cab gives the equivalent of a three-point suspension thereof. Within the cabs are the necessary control apparatus, air compressor, etc. My complete locomotive is composed of two of these halves, oppositely disposed and coupled end to end by a leading connection 13 between the adjacent ends of the symmetrical trucks D. This leading connection 13 also comprises a hinged joint but is preferably arranged to allow for a certain amount of vertical movement so that any vertical movement of one of the symmetrical trucks will have no effect on the other symmetrical truck. In this way the two halves of the locomotive are entirely independent so far as the equalization is concerned but are coupled together in such a manner as to do the proper guiding and to take the hauling and bumping strains which are necessary in the operation of a locomotive. If desired, however, the leading connection 13 may be constructed without allowing for any vertical movement between the parts of the joint but in this case one or both of the leading connections 9 must be arranged for such vertical movement.

Referring particularly to Fig. 3 in which the spring system of suspension for the truck frames is diagrammatically illustrated in perspective, it is seen that the frame 5 of the unsymmetrical truck C is supported upon its four journal boxes and thereby upon its two driving axles by springs 14, links 15, and equalizing levers 16, arranged as shown. With this arrangement each side of the truck is in effect supported jointly upon the two journal boxes on that side at a point $a$. The third point of support for this truck frame is on the center pin 17 of the guiding truck E. The frame 7 of the symmetrical truck D is supported upon its four journal boxes and thereby upon its driving axles by springs 18, links 19, and equalizing levers 20. With this arrangement each side of the truck is also in effect supported jointly upon each of its two journal boxes on that side at a point $b$. This means that the frame of the truck D is in effect supported in unstable equilibrium about an axis passing through the points $b, b$ but the leading connection 9 between the trucks C and D or the leading connection 13 between the two trucks D (whichever is constructed to prevent vertical movement) serves to hold the frame of the truck D in stable equilibrium.

I desire to be understood that my invention is not limited to the particular arrangement of locomotive shown and described, and I aim in the appended claims to cover all modifications which do not depart from the spirit and scope of my invention.

What I claim as new and desire to secure by Letters Patent of the United States, is,—

1. In an electric locomotive, an unsymmetrical truck and a symmetrical truck, said unsymmetrical truck having a main truck frame, a plurality of driving axles, a spring system of suspension for supporting said truck frame on said driving axles jointly at two points one on each side of said truck, and a guiding truck, said truck frame having a pivotal bearing on said guiding truck, said symmetrical truck having a truck frame, a plurality of driving axles, and a spring system of suspension for supporting said truck frame on said driving axles jointly at two points one on each side of said truck, a leading connection between said unsymmetrical and said symmetrical trucks, a cab, and pivotal connections for said cab, one of said connections for said cab being located on said unsymmetrical truck and the other of said connections being located on said symmetrical truck.

2. In an electric locomotive, two running gear sections, each comprising an unsymmetrical truck and a symmetrical truck, said unsymmetrical trucks having a main truck frame, a plurality of driving axles, a spring system of suspension for supporting said truck frame on said driving axles jointly at two points one on each side of said truck, and a guiding truck, said truck frame having a pivotal bearing on said guiding truck, said symmetrical trucks having a truck frame, a plurality of driving axles, and a spring system of suspension for supporting said truck frame on said driving axles jointly at two points one on each side of said truck, a leading connection between said unsymmetrical and said symmetrical trucks, a cab, and pivotal connections for said cab, one of said connections for said cab being located on said unsymmetrical truck and the other of said connections being located on said symmetrical truck, and a leading connection between said symmetrical trucks of said running gear sections.

3. In an electric locomotive, two running gear sections, each comprising an unsymmetrical truck and a symmetrical truck, said unsymmetrical trucks having a main truck frame, a plurality of driving axles, a spring system of suspension for supporting said truck frame on said driving axles jointly at two points one on each side of said truck, and a guiding truck, said truck frame having a pivotal bearing on said guiding truck, said symmetrical trucks having a truck frame, a plurality of driving axles, and a spring system of suspension for supporting said truck frame on said driving axles jointly at two points one on each side of said truck, a leading connection between said unsymmetrical and said symmetrical trucks constructed to prevent vertical movement, a cab, and pivotal connections for said cab, one of said connections for said cab being located on said unsymmetrical truck and the other of said connections being located on said symmetrical truck, and a leading connection between said symmetrical trucks of said running gear sections comprising a hinged joint arranged to allow for vertical movement in either of said symmetrical trucks without affecting the other of said symmetrical trucks.

In witness whereof, I have hereunto set my hand this 25th day of January, 1916.

ASA F. BATCHELDER.